Sept. 3, 1940.   W. M. BROOK   2,213,898
BRANDING DEVICE
Filed March 22, 1938
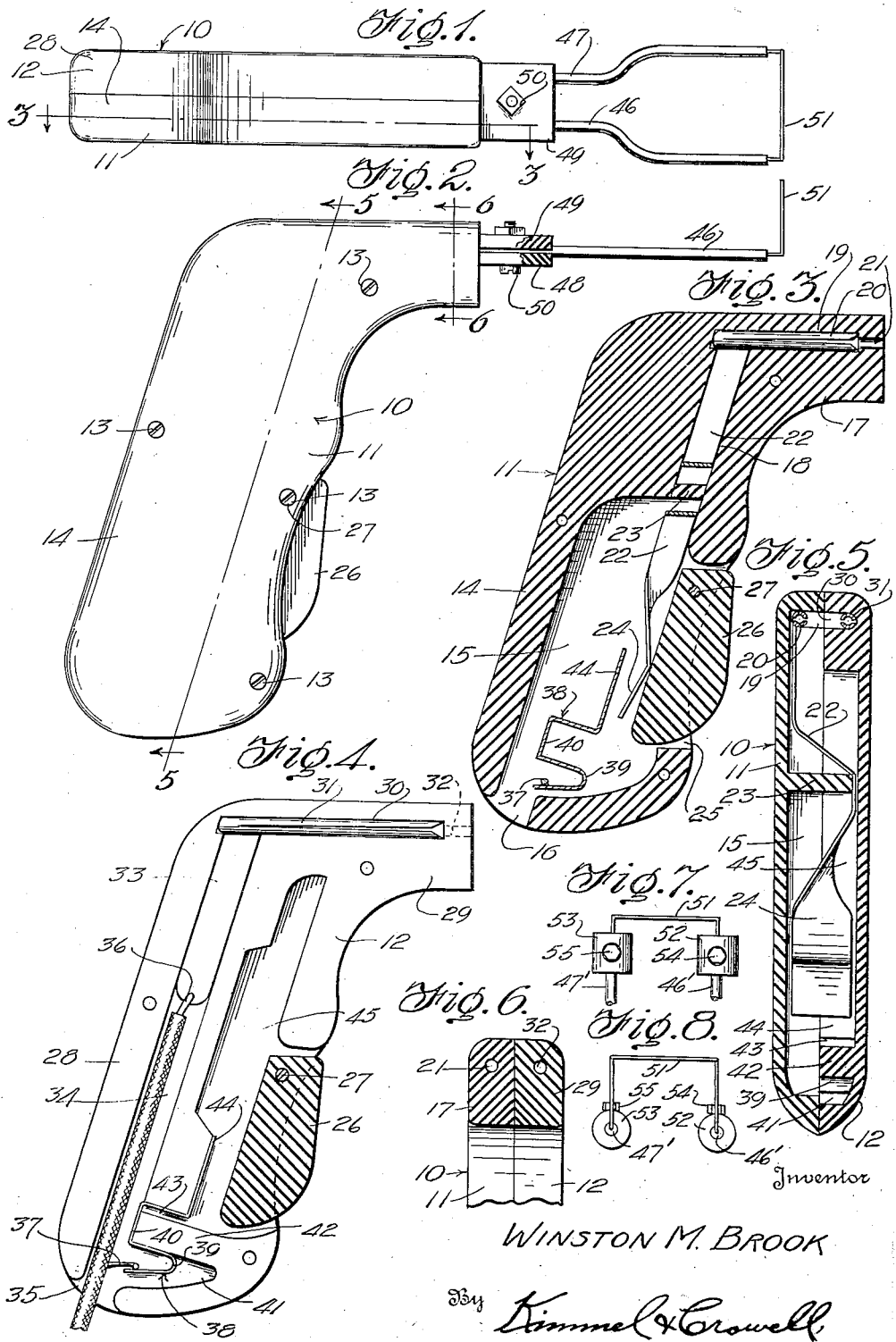
Inventor
WINSTON M. BROOK
By Kimmel & Crowell
Attorneys Patented Sept. 3, 1940

2,213,898

UNITED STATES PATENT OFFICE 2,213,898

BRANDING DEVICE

Winston Marshall Brook, Lampasas, Tex.

Application March 22, 1938, Serial No. 197,493

6 Claims. (Cl. 219—30)

This invention relates to a branding device for use in branding domestic animals and more particularly to a branding device for use in branding animals having a relatively heavy coat of fur or hair.

An object of this invention is to provide a branding device which is relatively light in weight and which includes means whereby the branding portion thereof may be maintained at the desired temperature so that the skin of the animal may be marked rapidly and without undue pain or injury to the animal.

Another object of this invention is to provide an electrically operated branding device which is adapted to be connected to a suitable source of electric current supply and preferably to a storage battery so that the device can be transported to the desired point and the animals branded, the device including a relatively simple circuit closing device forming part of the handle.

A further object of this invention is to provide a branding means constructed to simulate a pistol which may be readily held in a hand and worked into the hair or fur of the animal and which is so constructed that the operator of the device will at all times be able to determine the degree of penetration of the branding portion thereof so that the animal will not be unduly harmed during the branding operation.

A still further object of this invention is to provide a branding device of this kind wherein the indicia forming the brand may be detachably coupled to the holder or handle, thus making is possible to interchange brands of different characters with the same holder.

To the above objects and others which may hereinafter appear, the invention consists of the novel construction, combination and arrangement of parts as will be more specifically referred to, and illustrated in the accompanying drawing wherein is shown an embodiment of the invention, but it is to be understood that changes, variations and modification may be resorted to which fall within the scope of the invention as claimed.

In the drawing:

Figure 1 is a detail top plan of a branding device constructed according to an embodiment of this invention, Figure 2 is a detail side elevation of the device, Figure 3 is a sectional view taken on the line 3—3, of Figure 1, Figure 4 is a detail side elevation of one-half of the holder showing the holder from the inside, Figure 5 is a longitudinal section taken on the line 5—5 of Figure 2, Figure 6 is a fragmentary sectional view taken on the line 6—6 of Figure 2, Figure 7 is a fragmentary top plan of a modified form of branding iron, and Figure 8 is a detail front elevation of the structure shown in Figure 7.

Referring to the drawing, the numeral 10 designates generally a holder which in the present instance is constructed of complementary one-half portions 11, 12. These complementary portions 11 and 12 are detachably secured together by means of screws or bolts 13 or the like.

The holder portion 11 comprises a handle 14 provided with a relatively large longitudinally extending switch chamber or compartment 15 therein which at its lower end has an opening 16 opening through the bottom of the handle 14. An obtusely disposed head 17 is formed integral with the upper end of the handle 14 and the handle 14 also is provided with a passage or recess 18 communicating with the chamber 15 at its lower end and communicating at its upper end with a contact chamber 19. A split tubular contact 20 of resilient construction is disposed in the chamber 19 and opens forwardly. A relatively small opening or passage 21 opens through the forward end of the head 17 and communicates with the chamber 19 for a purpose which will be hereinafter described.

A connecting strip 22 is secured at its upper end to the tubular spring contact or socket 20 and extends downwardly through the recess or connecting passage 18 and is then bent laterally over a partition or dividing wall 23 as shown in Figure 5. This connecting strip 22 is then extended downwardly and twisted substantially one-half turn so as to provide a yieldable switch member 24. This switch member 24 as shown in Figure 3 is of substantially V-shape and is disposed in the switch chamber 15.

The handle 14 is provided at its forward side with a slot 25 in which a trigger or switch operating member 26 is adapted to be loosely mounted. This trigger or switch operating member 26 is pivotally mounted on a pivotal member 27 which in the present instance may be one of the bolts used in securing the holder parts together. The inner edge of the trigger 26 is adapted to engage the switch member 24 so that inward movement of the operating member 26 will effect similar movement to the switch member 24.

The holder portion 12 comprises a handle 28 similar in configuration to the handle 14 so that when these two parts are secured together a substantial handle will be provided. The handle 28 also has a head 29 similar to the head 17 and this head 29 is provided with a recess or chamber 30 in which a split socket or contact member 31 is mounted. The head 29 is also provided with an opening 32 which opens through the forward end of the head 29 and communications with the contact chamber 30. A metal strip 33 is secured at its upper end to the resilient socket 31 and extends downwardly and longitudinally of the handle 28 being removably mounted in a relatively long recess or compartment 34 which opens as at 35 in the lower end of the handle 28. One wire 36 of a two-wire conductor is connected to the strip 33 and the other wire 37 of this conductor is secured to a metal contact strip 38. This strip 38 is bent upon itself so as to provide reverted U-parts 39 and 40 and the free end of the U-portion 39 is disposed in a lower chamber or recess 41 provided in the handle 28. The U-portion 40 of the strip 38 is extended about a dividing wall 42 and is then positioned in a lateral passage 43. The free end of the U-part 40 is then extended upwardly as at 44 and this free end part forms a fixed switch terminal which is adapted to be contacted by the movable switch member 24 upon inward movement of the trigger or operating member 26. The handle 28 is provided with a chamber 45 in which the terminal end 44 of the contact strip 38 is positioned so that the free end 44 of this strip will be disposed in contacting relation with one wall of the chamber 45.

A pair of spaced apart electrodes 46 and 47 are adapted to be detachably engaged in the spring socket members 20 and 31. These electrodes 46 and 47 are clamped together by means of insulated clamping means 48 and 49 which are held together by means of a central bolt 50. This clamping device 48, 49 also provides a limiting means for limiting the insertion of the electrodes 46 and 47 in the socket members 20 and 31.

The outer ends of the electrodes 46 and 47 have secured thereto a heating element 51 which is constructed of such material that it will become heated to the desired degree upon closing the switch. This branding member 51 is here disclosed as a substantially U-shaped member but in practice branding member 51 may assume any suitable configuration depending upon the character of brand which it is desired to apply to the skin of the animal.

In Figures 7 and 8 there is disclosed a modified form of branding means wherein the electrodes 46' and 47' have detachably mounted thereon a pair of socket members 52 and 53. These socket members 52 and 53 are secured to the electrodes 46' and 47' by means of screws 54 and 55 respectively. In this instance the branding member 51' is secured to the two socket members 52 and 53 so that it is not necessary that the electrodes 46' and 47' be removed from the holder.

In use and operation of this branding device, the wires 36 and 37 are adapted to be connected to a suitable source of electric current supply and in the present instance may be connected to a storage battery or the like. The switch operating member 26 may be pressed inwardly by one or more fingers with the handle members 14 and 28 disposed in one hand. The inward movement of the operating member 26 will move the movable switch member 24 into contact with the stationary member 44 so that the circuit will be closed to the branding member 51. The operating member 26 can be held in closed position a sufficiently long period of time to provide the desired heat in the branding member 51 whereupon this branding member 51 may be engaged with the skin of the animal so as to produce the desired brand on the skin. By means of the relatively rigid electrodes 46 and 47 the branding member 51 may be easily worked into the long hair or fur of the animal and due to the fact that the branding member 51 extends upwardly from the electrodes 46 and 47, it is relatively easy for the operator to quickly determine whether the branding member 51 is in direct contact with the skin so that this branding member 51 will not be held against the skin too long which would cause undue pain to the animal.

With the use of this branding device the branding of small heavy coated animals is a relatively simple procedure and due to the fact that the branding member 51 may be maintained at a predetermined temperature it is not necessary to provide more than one of these branding devices for the branding of a great number of animals. In addition the branding member 51 being of open construction may be easily worked into the fur or hair of the animal so that either long or short haired animals can be easily and quickly branded without burning a great amount of hair. This device will also make it unnecessary for several persons to be engaged in the handling of the branding irons as is the case where branding irons are heated in the separate fire or heating means and then applied to the animal. This latter procedure makes it necessary to use extra heavy branding irons in order to retain heat for the desired length of time, but these heavy branding irons also have the disadvantage of becoming overheated or underheated, thus making a uniform branding problematical.

The hereinbefore described switch structure is disposed within the holder or handle which as hereinbefore stated is constructed of separable holder portions so that the switch members may be readily repaired or renewed, and the operating member 26 is disposed on the forward side of the handle or holder in a position for engagement with one or more fingers of a hand grasping the handle or holder. In this manner the operating member 26 may be rocked inwardly by pressure of one or more fingers so as to close the switch structure for the desired length of time to heat the branding member 51.

What I claim is:

1. A branding means comprising a handle, a head secured to said handle and formed lengthwise thereof with a chamber, a switch disposed in said handle, a switch operator carried by said handle, a pair of resilient socket member disposed in parallel spaced relation within said chamber, said head being formed with a pair of spaced parallel openings leading outwardly from said chamber to the outer end of the head and each having its inner end in registry with an end of a socket member, means connecting said socket members with said switch, a pair of electrodes extending through said openings and engaging in said sockets and projecting forwardly of said head, means engaging said electrodes holding said electrodes in spaced relation while simultaneously limiting the insertion of said electrodes in said socket members, and a branding member secured to the terminal ends of said electrodes and projecting at right angles with respect thereto.

2. A branding means comprising an insulated handle, an obtusely disposed head carried by said handle, a switch in said handle, a pivoted switch operating member carried by said handle, a pair of resilient sockets carried by said head, said head having a pair of openings through the forward end thereof communicating with said sockets, a pair of relatively rigid electrodes engaging at one end in said sockets, means engaging said electrodes holding said electrodes in spaced relation while simultaneously limiting the insertion of said electrodes in said socket members, and a branding member fixedly secured to the outer ends of said electrodes.

3. A branding means comprising an insulated handle, an obtusely disposed head carried by said handle and formed lengthwise thereof with a chamber, a pair of yieldable tubular socket members mounted in said chamber in spaced apart parallel relation, said head being formed with a pair of spaced parallel openings leading outwardly from said chamber to the outer end of the head and each having its inner end in registry with one end of a socket member, means connecting one of said socket members to said switch, means connecting the other of said socket members to a source of electric current supply, a pair of relatively rigid electrodes extending through said openings and detachably engaging in said sockets, means engaging said electrodes holding said electrodes in spaced relation while simultaneously limiting the insertion of said electrodes in said socket members, and a branding member fixedly secured to the outer ends of said electrodes.

4. A branding means comprising a handle, an obtusely disposed head carried by said handle and formed lengthwise thereof with a chamber, a switch disposed in said handle, a pair of resilient socket members mounted in said chamber in spaced apart parallel relation, said head being formed with a pair of spaced parallel openings leading outwardly from said chamber to the outer end of the head and each having its inner end in registry with one end of a socket member, means connecting one of said socket members to one side of said switch, means connecting the other of said socket members to a source of electric current supply, a pair of relatively rigid electrodes extending through said openings and removably engaging in said sockets, clamping means engaging said electrodes and holding said electrodes in spaced apart relation and engageable with the outer end of said head to limit the insertion of said electrodes in said sockets, and a branding member carried by the outer ends of said electrodes.

5. A branding means comprising an insulated handle, a head carried by said handle, a pair of spaced apart parallel socket members carried by said head, a switch in said handle, means connecting one of said socket members to one side of said switch, means connecting the other of said socket members to a source of electric current supply, a pair of electrodes removably engaging in said sockets, insulated clamping means engaging said electrodes for holding said sockets in spaced apart relation, said clamping means engaging the outer end of said head to thereby limit the insertion of said electrodes in said sockets while simultaneously holding said electrodes in spaced apart relation, and a branding member carried by the terminal ends of said electrodes.

6. A branding means comprising an insulated handle, a head carried by said handle, and formed lengthwise thereof with a chamber, a switch in said handle, a switch operator pivotally carried by said handle adjacent the forward edge thereof, a pair of socket member mounted in said chamber, said head being formed with a pair of spaced parallel openings leading outwardly from said chamber to the outer end of the head and each having its inner end in registry with an end of a socket member, means connecting said socket members to said switch, a pair of electrodes extending through said openings and engaging in said sockets, insulated clamping means engaging said electrodes for holding said electrodes in spaced apart relation, said clamping means engaging the outer end of said head to thereby limit the insertion of said electrodes in said sockets, a branding member, and means fixedly secured to said branding member engaging the outer ends of said electrodes for detachably securing said branding member to said electrodes.

WINSTON M. BROOK.